(12) United States Patent
Suzuki et al.

(10) Patent No.: US 9,321,480 B2
(45) Date of Patent: Apr. 26, 2016

(54) VEHICLE STEERING CONTROL APPARATUS

(75) Inventors: Yoshiaki Suzuki, Shizuoka-ken (JP); Theerawat Limpibunterng, Susono (JP); Toru Takashima, Susono (JP); Takahiro Kojo, Gotenba (JP); Taro Hirose, Susono (JP); Yoshiaki Tsuchiya, Miyoshi (JP); Masahiro Miyata, Nagoya (JP); Susumu Fujii, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 99 days.

(21) Appl. No.: 13/811,697

(22) PCT Filed: Jun. 1, 2011

(86) PCT No.: PCT/JP2011/062632
§ 371 (c)(1),
(2), (4) Date: Jan. 23, 2013

(87) PCT Pub. No.: WO2012/164706
PCT Pub. Date: Dec. 6, 2012

(65) Prior Publication Data
US 2013/0124045 A1    May 16, 2013

(51) Int. Cl.
*B62D 6/00* (2006.01)
*B62D 5/00* (2006.01)
*B62D 5/04* (2006.01)
*B62D 7/15* (2006.01)

(52) U.S. Cl.
CPC *B62D 6/00* (2013.01); *B62D 5/008* (2013.01); *B62D 5/0481* (2013.01); *B62D 7/159* (2013.01)

(58) Field of Classification Search
None
See application file for complete search history.

(56) References Cited

U.S. PATENT DOCUMENTS

| 7,164,978 B2 * | 1/2007  | Takaki et al. ............... 701/41 |
| 7,389,851 B2 * | 6/2008  | Miyaura ..................... 180/446 |
| 7,526,372 B2 * | 4/2009  | Tsutsumi et al. ............. 701/43 |
| 7,853,378 B2 * | 12/2010 | Ishikawa et al. ............. 701/41 |

(Continued)

FOREIGN PATENT DOCUMENTS

| DE | 103 23 042     | 2/2004 |
| DE | 60 2005 001 975 | 5/2008 |

(Continued)

*Primary Examiner* — John R Olszewski
*Assistant Examiner* — Jean-Paul Cass
(74) *Attorney, Agent, or Firm* — Finnegan, Henderson, Farabow, Garrett & Dunner, LLP

(57) ABSTRACT

A vehicle steering control apparatus (100) in a vehicle (10), which is provided with: a steering system including at least a rudder angle varying device (400, 700) capable of changing a relation between a steering angle, which is a rotation angle of a steering wheel (12), and a rudder angle of steered wheels and a steering torque assisting device (500) capable of assisting a driver steering torque; and a power supply source (800) for supplying electric power to the steering system, is provided with: a limiting device for limiting electric current consumption of the steering torque assisting device if a consumption current value of the steering system is greater than a maximum allowable current value in a case where supply capacity of supplying an electric current in the power supply source is reduced with respect to a reference; and a controlling device for matching a neutral position of the steering wheel with a neutral position of the steered wheels in a situation in which the electric current consumption of the steering torque assisting device is limited.

6 Claims, 6 Drawing Sheets

(56) References Cited

U.S. PATENT DOCUMENTS

| | | | |
|---|---|---|---|
| 8,200,392 B2* | 6/2012 | Kodaira et al. | 701/41 |
| 8,483,912 B2* | 7/2013 | Takashima | 701/41 |
| 8,511,420 B2* | 8/2013 | Kojo et al. | 180/446 |
| 2005/0269151 A1 | 12/2005 | Miyaura | |
| 2006/0011405 A1 | 1/2006 | Bayer et al. | |
| 2006/0190151 A1* | 8/2006 | Tsutsumi et al. | 701/41 |
| 2007/0192005 A1* | 8/2007 | Ishikawa et al. | 701/41 |
| 2008/0066991 A1* | 3/2008 | Kataoka et al. | 180/443 |
| 2009/0132126 A1* | 5/2009 | Tamaizumi | 701/42 |
| 2011/0036660 A1* | 2/2011 | Kojo et al. | 180/446 |
| 2011/0098887 A1* | 4/2011 | Fujimoto | 701/41 |
| 2011/0264326 A1* | 10/2011 | Iwasaki | 701/41 |
| 2011/0264330 A1* | 10/2011 | Kimpara et al. | 701/42 |
| 2012/0158246 A1* | 6/2012 | Takashima | 701/41 |
| 2013/0013154 A1* | 1/2013 | Aoki | 701/42 |
| 2013/0124045 A1* | 5/2013 | Suzuki et al. | 701/41 |

FOREIGN PATENT DOCUMENTS

| | | |
|---|---|---|
| DE | 10 2009 012 932 | 9/2010 |
| JP | 2001-287657 | 10/2001 |
| JP | 2001287657 A * | 10/2001 |
| JP | 2005-343323 | 12/2005 |
| JP | 2005343323 A * | 12/2005 |
| JP | 2008-290664 | 12/2008 |
| JP | 2010-18177 | 1/2010 |
| JP | 2010018177 A * | 1/2010 |
| JP | 2010-208490 | 9/2010 |

* cited by examiner

VEHICLE STEERING CONTROL APPARATUS

CROSS-REFERENCE TO RELATED APPLICATIONS

This application is a national phase application of International Application No. PCT/JP2011/062632, filed Jun. 1, 2011, the content of which is incorporated herein by reference.

TECHNICAL FIELD

The present invention relates to a vehicle steering control apparatus, which can be applied to a vehicle which is provided with: a rudder angle varying device, such as a variable gear ratio steering (VGRS) and an active rear steer (ARS), capable of changing a relation between a steering angle and a rudder angle of steered wheels independently of a driver's steering input; and an assisting device, such as an electronic controlled power steering (EPS), capable of assisting a driver steering torque.

BACKGROUND ART

In this type of vehicle, there is an apparatus for dealing with a voltage drop of a battery functioning as a power supply source for the rudder angle varying device (refer to a patent document 1). According to a vehicle steering control apparatus disclosed in the patent document 1, when it is detected that the voltage of the battery is less than or equal to a predetermined driving device fixed voltage, a rotation angle of the VGRS as a driving device is fixed. Moreover, after that, when it is detected that a wheel (also referred to as a steering wheel) is turned back, a deviation between a neutral position of the steering wheel and a vehicle straight-ahead driving position, which occurs when the rotation angle of the driving device is fixed, is corrected. Thus, it is believed that it is possible to correct the deviation between the neutral position of the steering wheel and the vehicle straight-ahead driving position while suppressing a load of the battery.

Incidentally, there is also suggested an apparatus for performing a neutral position return on left and right wheels in a period between an ignition off, in which electric power is ensured, and an engine stop (refer to a patent document 2).

Moreover, there is also suggested an apparatus for suppressing an output of the EPS at multiple steps in the voltage drop (e.g. refer to a patent document 3).

PRIOR ART DOCUMENT

Patent Document

Patent document 1: Japanese Patent Application Laid Open No. 2010-208490
Patent document 2: Japanese Patent Application Laid Open No. 2010-018177
Patent document 3: Japanese Patent Application Laid Open No. 2005-343323

DISCLOSURE OF INVENTION

Subject to be Solved by the Invention

According to the rudder angle varying device, it is possible to give a desired rudder angle change, for example, via a motor and an actuator or the like to the steering angle which is an angle of a driver's operating the steering wheel (a rotation angle of the steering wheel). Moreover, normally, the rudder angle change given in this manner is canceled in the turning and the turning back of the steering wheel. Thus, in the condition that the steering wheel is returned to the neutral position, the rudder angle of the steered wheels also returns to a rudder angle neutral point allowing the vehicle to drive straight. In other words, the neutral position of the steering wheel and the neutral position of the steered wheels match each other.

However, in the battery voltage drop, for example, a driving force of the motor and the actuator or the like is insufficient after the rudder angle change is given in the turning of the steering wheel, and thus, the rudder angle change cannot be sufficiently returned in turning back of the steering wheel in some cases. If this type of situation happens, a balance in the rudder angle change between the turning and the turning back of the steering wheel does not become zero, allowing a frequent discrepancy between the neutral position of the steering wheel and the neutral position of the steered wheels.

Regarding such a discrepancy, the magnitude thereof likely increases with increasing period in which the battery cannot supply a sufficient voltage. Thus, as in the apparatus disclosed in the patent document 1, locking the rotation of the motor and the actuator or the like for providing variability for the relation between the steering angle and the rudder angle in the detection of the voltage drop is also one effective measure from the viewpoint of stopping the progression of the situation.

However, in the apparatus disclosed in the patent document 1, the further generation of the deviation is suppressed by locking the rotation of the rudder angle varying device, whereas the relation between the neutral position of the steering wheel and the neutral position of the steered wheels, which has been already disrupted, is not mended until the steering wheel is turned back. Therefore, the vehicle is forced to drive in the condition of the disrupted relation between the neutral position of the steering wheel and the neutral position of the steered wheels for a short time.

As described above, in the condition that both the neutral positions do not match each other, although the driver intends to drive the vehicle straight ahead and maintains the steering wheel at the neutral position, there is a fair rudder angle change left in the steered wheels. Thus, the vehicle deviates, and a vehicle motion does not match the driver's feeling. As a result, there arises a need to continue the steering operation while the driver feels uncomfortable, and the steering feeling deteriorates.

In other words, in the apparatus disclosed in the patent document 1, there is room for improvement in the steering feeling in the battery voltage drop in the vehicle with the rudder angle varying device installed.

In particular, regarding such a battery voltage drop, the frequency of occurrence thereof is relatively high in the vehicle including a steering torque assisting device, such as the EPS, sharing the battery with this type of rudder angle varying device, as a steering system. Therefore, this type of vehicle has a higher necessity of improving the steering feeling.

Incidentally, the apparatus disclosed in the patent document 2 does not indicate how to deal with the case where the battery voltage drop occurs while the vehicle is moving, and such a problem can occur in the same manner.

Moreover, the apparatus disclosed in the patent document 3 indicates a method of driving the EPS in the voltage drop, but does not define at all a method of controlling the VGRS in the voltage drop and cannot solve the aforementioned problems.

In view of the aforementioned problems, it is therefore an object of the present invention to provide a vehicle steering control apparatus capable of reducing the degree of the deterioration of the steering feeling in the battery voltage drop in a vehicle provided with the rudder angle varying device and the steering torque assisting device.

Means for Solving the Subject

The above object of the present invention can be achieved by a vehicle steering control apparatus in a vehicle, the vehicle provided with: a steering system including at least a rudder angle varying device capable of changing a relation between a steering angle, which is a rotation angle of a steering wheel, and a rudder angle of steered wheels and a steering torque assisting device capable of assisting a driver steering torque; and a power supply source for supplying electric power to the steering system, the vehicle steering control apparatus provided with: a supply capacity specifying device for specifying a supply capacity of supplying the electric power in the power supply source: a consumption current specifying device for specifying a consumption current value of the steering system: a limiting device for limiting electric current consumption of the steering torque assisting device if the specified consumption current value is greater than a maximum allowable current value of the steering system in a case where the specified supply capacity is reduced with respect to a reference; and a controlling device for controlling the rudder angle varying device such that a neutral position of the steering wheel matches a neutral position of the steered wheels in a situation in which the electric current consumption of the steering torque assisting device is limited.

The vehicle steering control apparatus of the present invention is installed in the vehicle which is provided with: the steering system including the rudder angle varying device and the steering torque assisting device; and the power supply source for supplying the electric current to the aforementioned devices. As a preferred form, it includes a computer apparatus, a processor, or the like and is provided with a memory, a sensor, or the like as occasion demands.

The rudder angle varying device is a device capable of variously changing the relation between the steering angle (the rotation angle of the steering wheel) and the rudder angle of the steered wheels, and it preferably means a rudder angle varying device regarding front wheels such as a VGRS, a rudder angle varying device regarding rear wheels such as an ARS, or various by wire devices such as a SBW (Steer By Wire: electronically-controlled rudder angle varying apparatus).

The steering torque assisting device is a device capable of supplying an assist torque for assisting a steering torque given by a driver via a steering input device such as the steering wheel (i.e. the driver steering torque), and it preferably means an EPS or the like. Incidentally, there are various supply destinations of the assist torque. For example, in such a configuration that the steered wheels are coupled with a steering output shaft through various steering mechanisms such as a rack and pinion mechanism, and that the aforementioned VGRS or the like is provided between the steering output shaft and a steering input shaft, the assist torque may be used to assist the rotation of the steering output shaft, may be used to assist the rotation of a pinion gear, and may be used to assist a linear motion of a rack bar.

Incidentally, the assist torque is a torque which can act in the same direction of the driver steering torque and in the opposite direction. If acting in the same direction of the driver steering torque, the assist torque can reduce a driver's steering load (a narrow sense of the term, assist). If acting in the direction opposite to the driver steering torque, the assist torque can increase the driver's steering load or can operate the steering wheel in a direction opposite to a driver's steering direction (which is within the range of the term, assist, in a broad sense).

Moreover, a control target of the assist torque may be set as an additional value of a plurality of control terms, such as an inertia control term corresponding to inertia characteristics of the steering mechanism and a damping control term corresponding to viscosity characteristics of the steering mechanism. In this case, in accordance with control aspects of each control term, for example, setting aspects of various gains, or the like, it is possible to realize various steering feelings.

Moreover, if the assist torque is made to act in a direction of canceling a steering reaction force (simply, a reaction force caused by a self-aligning torque acting around a kingpin shaft of the steered wheels) transmitted to the steering input device (simply, the steering wheel) from the steered wheels, the steering reaction force can be also reduced or canceled.

The power supply source for supplying the electric power to the above devices means, as a preferred form, a power generating device such as, for example, an in-vehicle battery apparatus in which a non-load voltage in the normal case is about 12V and an alternator capable of supplying generated output to the battery apparatus or capable of directly supplying electric power to various electrical auxiliaries without via the battery apparatus. Alternatively, in an electric vehicle (EV) or a hybrid vehicle provided with various rotating electrical machines, such as a motor and a motor generator, instead of or in addition to an internal combustion engine as a power source for the vehicle, or the like, the power supply source may be a secondary battery apparatus or the like with a non-load voltage of several hundreds V, which is obtained by connecting several hundreds of second battery cells each having a cell voltage of about V and which is provided only for supplying driving power from the rotating electrical machines.

According to the vehicle steering control apparatus of the present invention, the supply capacity of supplying the electric power in the power supply source is specified, and the consumption current value of the steering system is specified. Incidentally, the term "specify" conceptually broadly includes finally determining something as a reference value, such as detect, calculate, derive, estimate, identify, select, and obtain. The supply capacity of supplying the electric power in the power supply source varies depending on a deterioration state, a temperature state, a load state, or the like of the power supply source. The consumption current value of the steering system varies depending on a vehicle driving or running condition and a steering system drive condition.

Incidentally, the "supply capacity of supplying the electric power" does not necessarily uniquely mean a clear physical quantity; however, at least in a case where "the supply capacity is low", the driving or operation of a device (including the steering system) using the power supply source is limited relatively easily in comparison with a case where the "supply capacity is high". In that point, a technical meaning indicated by the "supply capacity of supplying the electric power" is clear and could be sufficiently understood by a skilled person in the art. The supply capacity as this meaning can be defined in a binary manner (i.e. simply, whether the supply capacity is "high" or "low") or at multiple stages, for example, on the basis of a non-load voltage value, a supply voltage value, a supply current value, a storage amount, a charge amount, a discharge amount, a discharge and charge balance or the like of the power supply source. Alternatively, it can be defined as a function or an index value which can be changed continuously (i.e. seamlessly).

The steering system, of course, can operate without any problem in practice if the power supply source operates in a normal operating range; however, if the supply capacity of supplying the electric power in the power supply source is less than or equal to the reference, it likely interferes with the operations of a part of the devices depending on the consumption current value of the steering system. Incidentally, the "reference" can be determined in advance experimentally, experientially, or theoretically, from the viewpoint of whether or not the steering system can be operated without any problem in practice, or from a similar viewpoint. Alternatively, it can be set, as occasion demands, on the basis of a setting process determined in advance experimentally, experientially, or theoretically.

Here, if the supply capacity of the power supplying device is reduced with respect to the reference as described above, then, the operations of the steering system can need to be partially limited in consideration of protection of the steering system or the power supply source, depending on the consumption current value of the steering system.

Illustrating a specific example, if the consumption current value of the steering system is greater than the maximum allowable current value that the steering system is allowed to use at that time point (such a permission can be given, for example, by a mechanical configuration or an electric control aspect), there is a possibility that either or both of the rudder angle varying device and the steering torque assisting device cannot provide supposed performance. In particular, if the rudder angle varying device falls into an overload state, it causes the discrepancy between the neutral position of the steering wheel and the neutral position of the steered wheels as described above, in a situation in which some rudder angle change has been already provided.

Here, in particular, priority is considered between the steering torque assisting device and the rudder angle varying device. In this case, in view of a point that the rudder angle change of the steered wheels is obtained by a steering operation even if the rudder angle varying device is not operating and in view of the extent of a driver's load when the steering wheel is operated without the assistance of the steering torque, the judgment that the operations of the steering toque assisting device are to be prioritized can be reasonably achieved.

However, if there is already the discrepancy in the neutral positions at a time point at which this type of voltage drop occurs, for example, even if the neutral positions are adjusted when the vehicle is stopped or when the steering wheel is turned back, the discrepancy remains in the neutral positions for a reasonable period. Thus, it is hard to avoid the deterioration of the steering feeling as described above.

Thus, in the vehicle steering control apparatus of the present invention, the electric current consumption of the steering torque assisting device is firstly limited by the action of the limiting device if the consumption current value specified by the consumption current specifying device is greater than the maximum allowable current value of the steering system in the case where the supply capacity of supplying the electric power in the power supply source specified by the supply capacity specifying device is reduced with respect to the reference. Moreover, the rudder angle varying device is controlled such that the neutral position of the steering wheel (i.e. a steering angle neutral point) matches the neutral position of the steered wheels (a rudder angle neutral point) by the action of the controlling device in the situation in which the electric current consumption of the steering torque assisting device is limited. In other words, to put it simply, in the vehicle steering control apparatus of the present invention, the operations of the steering torque assisting device are temporarily limited, and the electric power enabling the rudder angle varying device to operate certainly is ensured, by which the matching between the neutral position of the steering wheel and the neutral position of the steered wheels is prioritized.

Therefore, according to the vehicle steering control apparatus of the present invention, it is avoided that the vehicle is forced to drive while the neutral position of the steering wheel does not match the neutral position of the steered wheels, and it is possible to provide a comfortable steering feeling for the driver.

In one aspect of the vehicle steering control apparatus of the present invention, the supply capacity specifying device specifies the supply capacity on the basis of a supply voltage value of the power supply source.

According to this aspect, it is possible to specify the supply capacity, quickly and accurately, on the basis of the supply voltage value having a high correlation with the supply capacity of supplying the electric power in the power supply source.

Here, in this aspect, the "reference" associated with the supply capacity described above can be alternatively defined by a reference voltage value which can be set for the supply voltage value. At this time, the "reference voltage value" may be the non-load voltage value in the normal case recognized in advance. From a practical viewpoint, in the power supply source, an internal resistance thereof causes a voltage drop according to the consumption current value of the steering system. Thus, the voltage drop to an extent according to the maximum consumption current vale of the steering system (such a value can be determined from the viewpoint of specifications) with respect to at least the non-load voltage value in the normal case can occur even in the normal operating range. In this regard, the reference voltage value may be a value obtained by subtracting the amount of this type of voltage drop from the non-load voltage value in the normal case.

Incidentally, for each of the rudder angle varying device and the steering torque assisting device which constitute the steering system, an operation guaranteed voltage can be defined in terms of design and specifications. The operation guaranteed voltage is a voltage which is lower than the non-load voltage value in the normal case of the power supply source and which can practically sufficiently correspond to a drive condition of the steering system which belongs to a range of use assumed in advance. The operation guaranteed voltage is set to have a voltage value higher than a value which is higher at least between a protection setting voltage value for the steering torque assisting device defined to immediately stop the steering torque assisting device and a protection setting voltage value for the rudder angle varying device defined to immediately stop the rudder angle varying device. More desirably, the operation guaranteed voltage is set to have a voltage value which is higher by the amount of the voltage drop or greater (e.g. which may include a margin to the side of safety) caused by the internal resistance described above, with respect to the relatively high protection setting voltage value. The reference voltage value associated with the supply voltage value may be the operation guaranteed voltage value having such a technical meaning.

In another aspect of the vehicle steering control apparatus of the present invention, the supply capacity specifying device specifies the supply capacity on the basis of a discharge and charge balance of the power supply source.

According to this aspect, it is possible to specify the supply capacity, quickly and accurately, on the basis of the discharge and charge balance of the power supply source having a high correlation with the supply capacity of supplying the electric power in the power supply source. More specifically, it can be said that the supply capacity of supplying the electric power in the power supply source is low in a situation in which the discharge and charge balance is inclined to the negative side (overdischarge), and it can be said that the power supply capacity of supplying the electric power in the power supply source is high in a situation in which the discharge and charge balance is plus minus zero or is inclined to the positive side (overcharge).

Incidentally, if the power supply source is any one of various batteries, the discharge and charge balance of the power supply source can have a unique relation with a difference between input electric power and output electric power of the battery. Moreover, in addition to the battery, if an alternator is considered to be one portion of the power supply source, the discharge and charge balance can have a unique relation with a difference between generated output of the alternator and discharged power of the battery.

In another aspect of the vehicle steering control apparatus of the present invention, the rudder angle varying device is provided with a locking mechanism for uniquely fixing the relation, and the controlling device controls the locking mechanism such that the relation is uniquely fixed after the neutral position of the steering wheel matches the neutral position of the steered wheels.

According to this aspect, by the action of the locking mechanism, the rudder angle varying device is in a lock state after the neutral position matching. Thus, after that, until the lock state is released, the relation between the steering angle and the rudder angle is physically fixed with uniquely high reliability. Therefore, it is possible to preferably provide an effect associated with the suppression of the deterioration of the steering feeling and physical protection of the rudder angle varying device.

In another aspect of the vehicle steering control apparatus of the present invention, the limiting device limits the electric current consumption in accordance with the maximum allowable current value.

A practical aspect when the limiting device limits the electric current consumption of the steering torque assisting device is relatively arbitrary from a conceptual viewpoint as long as an electric current for matching the neutral position of the steering wheel and the neutral position of the steered wheels is ensured. However, from the viewpoint of an effect associated with the assistance of the driver steering torque by the steering torque assisting device, the degree of the limitation is desirably small.

According to this aspect, qualitatively, the limitation is reduced with an increase in the maximum allowable current value which is allowed to be used for the steering system, and the degree of the limitation increases with a reduction in the maximum allowable current value. Therefore, in a range that a measure associated with the neutral position matching can be conducted without delay, the assistance of the driver steering torque by using the assist torque can be continued as long as possible.

In another aspect of the vehicle steering control apparatus of the present invention, the rudder angle varying device includes: a front wheel rudder angle varying device in which front wheels are regarded as the steered wheels: and a rear wheel rudder angle varying device in which rear wheels are regarded as the steered wheels, and the controlling device preferentially controls one of the front wheel rudder angle varying device and the rear wheel rudder angle varying device, which has a larger deviation amount from the neutral position of the steered wheels in the steered wheels with respect to the neutral position of the steering wheel.

According to this aspect, the vehicle is provided with the front wheel rudder angle varying device and the rear wheel rudder angle varying device, as the rudder angle varying device. In such a configuration, if the consumption current value of the steering system exceeds the maximum allowable current value, which rudder angle varying device firstly conducts the measure associated with the neutral position matching can have an important meaning. For example, if preceding the measure for one of the rudder angle varying devices enables the driver's feeling to be better than preceding the measure for the other device, it can give reasonable grounds for preceding the measure for the one device is preceded.

According to this aspect, the measure associated with the neutral position matching is started preferentially from the rudder angle varying device, which has a larger deviation amount (i.e. steering off-center angle) between the neutral position of the steering wheel and the neutral position of the steered wheels. Therefore, the deviation of the vehicle which does not correspond to the driver's feeling can be minimized, and the deterioration of the steering feeling can be suppressed as much as possible.

Incidentally, in this aspect, the deviation amount from the neutral position of the steered wheels with respect to the neutral position of the steering wheel may be calculated at each time. However, in a simpler configuration, the device out of the front wheel rudder angle varying device and the rear wheel rudder angle varying device, which has a larger deviation amount from the neutral position of the steered wheels with respect to the neutral position of the steering wheel when a maximum rudder angle is controlled may be determined as a preferential target in advance in a design phase and an experimental phase.

In another aspect of the vehicle steering control apparatus of the present invention, the vehicle is provided with an internal combustion engine and an alternator, and the maximum allowable current value varies depending on a vehicle speed, an outside air temperature, an engine rotational speed of the internal combustion engine, or amount of power generated by the alternator.

The maximum allowable current value is an electric current value which is allowed to be used at that time point for the steering system from physical, electrical, or control limitations or the like. Therefore, the maximum allowable current value is not necessarily a fixed value but desirably a variable value. In particular, in the vehicle having an electrically driven braking system, the electric current value required to brake the vehicle increases with increasing vehicle speed (for example, a relatively large drive power of an electrically driven pump of a brake actuator is required). Moreover, in general, the power supply source tends to have performance degradation (e.g. a reduction in discharge and charge efficiency and a discharge and charge rate) when the outside air temperature is too high or too low. Moreover, even in a use area in which there is no performance degradation, if the outside air temperature is high, power consumption of an air conditioner tends to increase, and the maximum allowable current value tends to be easily limited by that much.

Moreover, in such a configuration that the vehicle is provided with the internal combustion engine and the alternator capable of performing power generation on a scale according to the engine rotational speed of the internal combustion engine, the generated output of the alternator can be used as the drive power of the steering system. Alternatively, the generated output of the alternator can be used to charge the power supply source. Moreover, the alternator can be considered to be a type of the "power supply source" of the present invention. Therefore, in a situation in which the amount of power generated by the alternator is relatively large, the maximum allowable current value can be set to be higher with respect to one supply capacity of the power supply source, in comparison with a situation in which the amount of power generated by the alternator is relatively small.

From these viewpoints, according to the configuration that the maximum allowable current value varies depending on the vehicle speed, the outside air temperature, the engine rotational speed of the internal combustion engine, or the amount of power generated by the alternator, it is possible to accurately determine the necessity of the measure associated with the neutral position matching, to more finely limit the steering torque assisting device in line with the vehicle driving or running condition at that time point, and to efficiently obtain the effect associated with the suppression of the deterioration of the steering feeling.

In another aspect of the vehicle steering control apparatus of the present invention, the vehicle comprises a braking system which shares the power supply source with the steering system, and the maximum allowable current value is a value obtained by subtracting a current value used by the braking system, from a current value which can be used by an entire chassis system including at least the steering system and the braking system.

According to this aspect, the braking system such as, for example, an electronic controlled braking system (ECB) is provided for the vehicle and has a configuration of sharing the power supply source with the steering system.

The current value which can be used in the entire chassis system including the braking system and the steering system can use a value established in designing the vehicle or in similar cases, or can be determined to be a value which changes as occasion demands in terms of vehicle driving control. However, if the braking system is compared with the steering system, the power supply to the braking system is considered to be prioritized from the viewpoint of ensuring high vehicle safety.

According to this aspect, from such a viewpoint, the value obtained by subtracting the current value used or required by the braking system, from the current value which can be used by the entire chassis system is set as the current value which is allowed for the steering system. Thus, vehicle braking properties are ensured certainly, and a balance of behavior control as the entire vehicle is preferably maintained.

The operation and other advantages of the present invention will become more apparent from an embodiment explained below.

MODE FOR CARRYING OUT THE INVENTION

Embodiment of the Invention

Hereinafter, various embodiments of the vehicle steering control apparatus of the present invention will be explained with reference to the drawings.

Configuration of Embodiment

Figure 1:
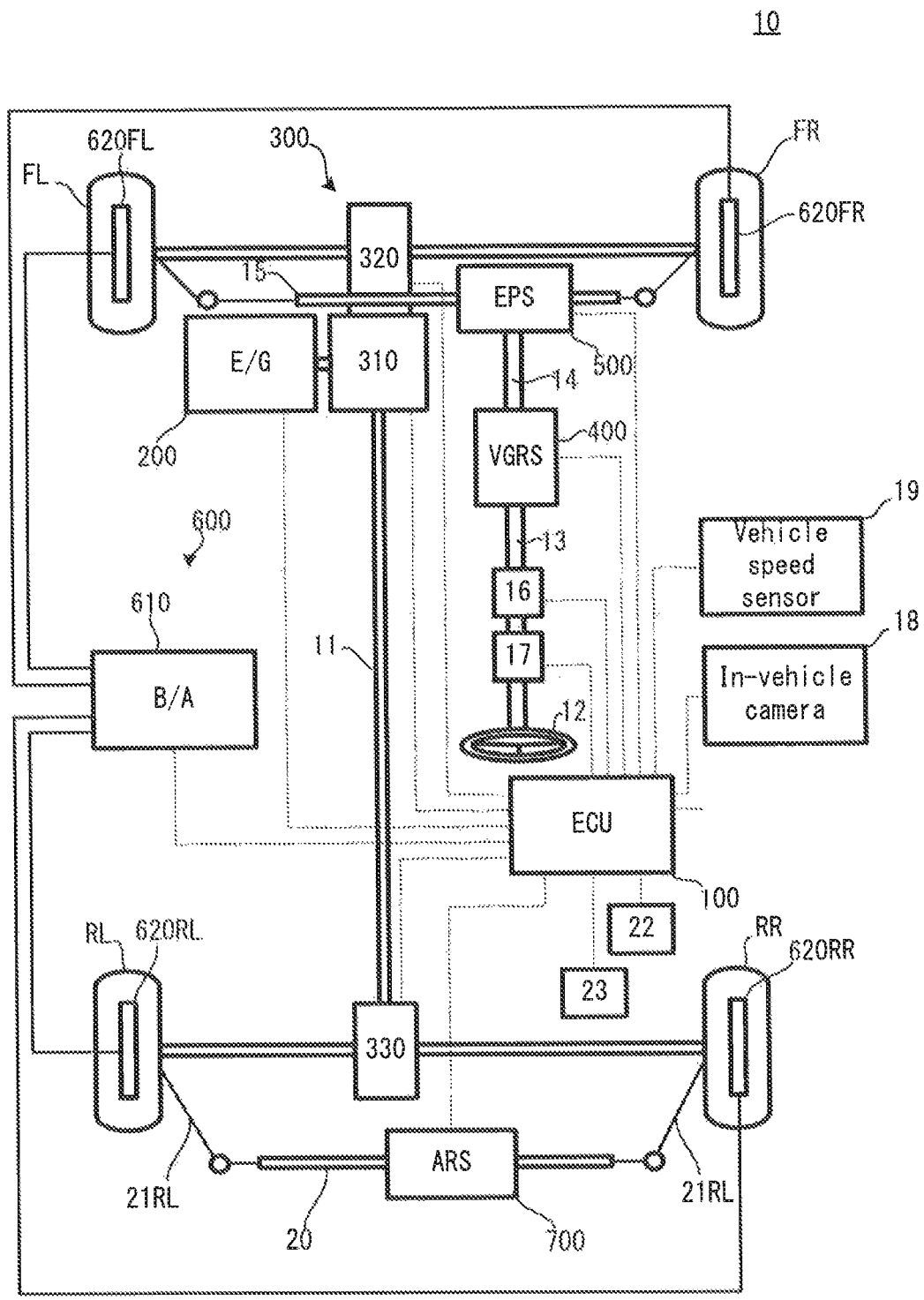
FIG. 1 is a schematic configuration diagram conceptually showing the configuration of a vehicle in an embodiment of the present invention.

Firstly, with reference to FIG. 1, the configuration of a vehicle 10 in an embodiment of the present invention will be explained. FIG. 1 is a schematic configuration diagram conceptually showing the basic configuration of the vehicle 10.

In FIG. 1, the vehicle 10 is provided with wheels, which are a left front wheel FL, a right front wheel FR, a left rear wheel RL, and a right rear wheel RR. The vehicle 10 is configured to move in a desired direction by a rudder angle change of the left front wheel FL and the right front wheel FR, which are steered wheels out of the wheels, and by a rudder angle change of the left rear wheel FL and the right rear wheel FR.

The vehicle 10 is provided with an ECU 100, an engine 200, a driving force distributing apparatus 300, a VGRS actuator 400, an EPS actuator 500, an ECB 600, and an ARS actuator 700.

The ECU 100 is provided with a central processing unit (CPU), a read only memory (ROM), and a random access memory (RAM), each of which is not illustrated, and it is an electronic control unit capable of controlling all the operations of the vehicle 10. The ECU 100 is one example of the "vehicle steering control apparatus" of the present invention. The ECU 100 is configured to perform a steering system control process described later, in accordance with a control program stored in the ROM.

Incidentally, the ECU 100 is a unified electronic control unit configured to function as one example of each of the "supply capacity specifying device", the "consumption current specifying device", the "limiting device", and the "controlling device" of the present invention, and all the operations of each of the devices are performed by the ECU 100. However, the physical, mechanical, and electrical configurations of each of the devices of the present invention are not limited to this example, and for example, each of the devices may be configured as various computer systems or the like such as a plurality of ECUs, various processing units, various controllers, or microcomputer apparatuses.

The engine 200 is one example of the "internal combustion engine" of the present invention, functioning as a power source for the vehicle 10. Incidentally, the "internal combustion engine" of the present invention conceptually includes an engine capable of converting thermal energy associated with the combustion of fuel into kinetic energy and eventually extracting it as the rotation of a power shaft (e.g. crankshaft). Therefore, in the internal combustion engine of the present invention, for example, fuel types, fuel supply aspects, fuel injection aspects, configurations of an intake/exhaust system, configurations of a valve operating system, aspects of an exhaust emission purifying apparatus, presence or absence of supercharging, the number of cylinders, cylinder arrangement and the like are arbitrary.

Incidentally, the ECU 100 can obtain sensor outputs from various sensors necessary for controlling the operations of the engine 200 with a regular or irregular period. This type of sensor includes, for example, an air-fuel ratio sensor for detecting an air-fuel ratio, a water temperature sensor for detecting a circulating water or coolant temperature, a crank position sensor for detecting a rotational position of a crankshaft, a throttle position sensor for detecting a rotational position of a throttle valve, an air flow meter for detecting an intake air amount, and the like. Moreover, in particular, the ECU 100 can calculate an engine rotational speed NE of the engine 200 by performing time-processing as needed on a sensor output of the crank position sensor (if a sensor such as an NE sensor is provided, it may be only necessary to obtain its sensor output).

Incidentally, the power source for the vehicle of the present invention is not limited to an internal combustion engine having various practical aspects as a concept including an engine capable of converting the combustion of the fuel into mechanical power and extracting it (the engine 200 is also its one example), but may be a rotating electrical machine, such as a motor. Alternatively, the vehicle may be a so-called hybrid vehicle in which they are cooperatively controlled. The crankshaft, which is a shaft for outputting a driving force of the engine 200, is connected to a center differential apparatus 310 as one constituent of the driving force distributing apparatus. Incidentally, since the detailed configuration of the engine 200 correlates weakly with the subject of the present invention, the details will be omitted herein.

The driving force distributing apparatus 300 is an apparatus capable of distributing an engine torque Te transmitted through the aforementioned crankshaft from the engine 200 to the front wheels and the rear wheels at a predetermined ratio and further capable of changing driving force distribution to the left and right wheels in each of the front wheels and the rear wheels. The driving force distributing apparatus 300 is provided with the center differential apparatus 310 (hereinafter abbreviated as a "center differential 310" as occasion demands), a front differential apparatus 320 (hereinafter abbreviated as a "front differential 320" as occasion demands), and a rear differential apparatus 330 (hereinafter abbreviated as a "rear differential 330" as occasion demands).

The center differential 310 is a limited slip differential (LSD: a differential mechanism with a differential limiting function) for distributing the engine torque Te supplied from the engine 200, to the front differential 320 and the rear differential 330. The center differential 310 distributes the engine torque Te to the front and rear wheels at a distribution ratio of (as one example but not limited to) 50:50 under the condition that a load acting on the front and rear wheels is substantially constant. Moreover, if a rotational speed of either one of the front and rear wheels is higher than that of the other, differential limit is performed such that a differential limiting torque acts on the one wheels and the torque is transferred to the other wheels. In other words, the center differential 310 is a so-called rotational-speed-sensing (viscous coupling) differential mechanism.

Incidentally, the center differential 310 is not limited to such a rotational-speed-sensing differential mechanism, but may be a torque-sensing differential mechanism in which a differential limiting action increases in proportion to an input torque. Moreover, it may be a distribution-ratio-variable differential mechanism in which a differential action is exerted by a planetary gear mechanism, in which the differential limiting torque is continuously changed by on-off control of an electromagnetic clutch, and in which a desired distribution ratio can be realized within a predetermined adjustable range. In any case, the center differential 310 may adopt various practical aspects regardless of being publicly known or unknown, as long as it can distribute the engine torque Te to the front wheels and the rear wheels.

The front differential 320 is a distribution-ratio-variable LSD capable of distributing the engine torque Te distributed to the side of a front axle (front wheel axle) by the center differential 310, further to the left and right wheels at a desired distribution ratio set within a predetermined adjustable range. The front differential 320 is provided with: a planetary gear mechanism including a ring gear, a sun gear, and a pinion carrier; and an electromagnetic clutch for providing a differential limiting torque. With the ring gear of the planetary gear mechanism, a differential case is coupled. With the sun gear and the carrier, the axle is coupled on either side. Moreover, the differential limiting torque is continuously controlled by electrification control for the electromagnetic clutch, and the distribution ratio of the torque is continuously variably controlled within a predetermined adjustable range which is determined in terms of physical and electrical configurations of the front differential 320.

The front differential 320 is electrically connected to the ECU 100, and the electrification control for the electromagnetic clutch is also controlled by the ECU 100. Therefore, the ECU 100 can generate a desired front wheel left-right braking/driving force difference (here, a driving force difference) $F_f$ through drive control of the front differential 320. Incidentally, the configuration of the front differential 320 is not limited to what is exemplified herein, but can have various aspects regardless of being publicly known or unknown, as long as it can distribute a driving force (incidentally, the torque and the driving force have a unique or unambiguous relation) to the left and right wheels at a desired distribution ratio. In any case, such a left-right driving force distributing action is publicly known, and its details are not mentioned herein to prevent a complicated explanation.

The rear differential 330 is a distribution-ratio-variable LSD capable of distributing the engine torque Te distributed to the side of a rear axle (rear wheel axle) through a propeller shaft 11 by the center differential 310, further to the left and right wheels at a desired distribution ratio set within a predetermined adjustable range. The rear differential 330 is provided with: a planetary gear mechanism including a ring gear, a sun gear, and a pinion carrier; and an electromagnetic clutch for providing a differential limiting torque. With the ring gear of the planetary gear mechanism, a differential case is coupled. With the sun gear and the carrier, the axle is coupled on either side. Moreover, the differential limiting torque is continuously controlled by electrification control for the electromagnetic clutch, and the distribution ratio of the torque is continuously variably controlled within a predetermined adjustable range which is determined in terms of physical and electrical configurations of the rear differential 330.

The rear differential 330 is electrically connected to the ECU 100, and the electrification control for the electromagnetic clutch is also controlled by the ECU 100. Therefore, the ECU 100 can generate a desired rear wheel left-right braking/driving force difference (here, a driving force difference) $F_r$ through drive control of the rear differential 320. Incidentally, the configuration of the rear differential 330 is not limited to what is exemplified herein, but can have various aspects regardless of being publicly known or unknown, as long as it can distribute a driving force (incidentally, the torque and the driving force have a unique or unambiguous relation) to the left and right wheels at a desired distribution ratio. In any case, such a left-right driving force distributing action is publicly known, and its details are not mentioned herein to prevent a complicated explanation.

In the vehicle 10, a steering input given by a driver via a steering wheel 12 is transmitted to an upper steering shaft 13 as a steering input shaft, which is coaxially rotatably coupled with the steering wheel 12 and which can rotate in the same direction as that of the steering wheel 12. The upper steering shaft 13 is coupled with the VGRS actuator 400 at its end on the downstream side.

Figure 2:
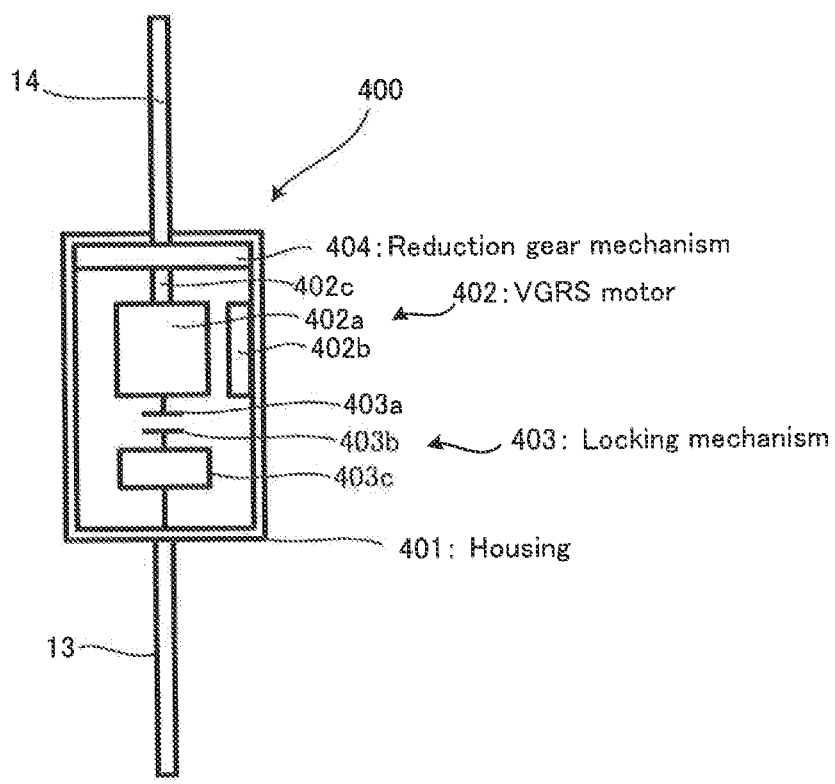
FIG. 2 is a simplified cross sectional view showing a VGRS actuator in the vehicle in FIG. 1.

Now, with reference to FIG. 2, the detailed configuration of the VGRS actuator 400 will be explained. FIG. 2 is a simplified cross sectional view showing the VGRS actuator 400. Incidentally, in FIG. 1, portions overlapping those of FIG. 1 will carry the same reference numerals, and the explanation thereof will be omitted as occasion demands.

The VGRS actuator 400 is provided with a housing 401, a VGRS motor 402, a locking mechanism 403, and a reduction gear mechanism 404.

The housing 401 is a case or enclosure of the VGRS actuator 400 for accommodating the VGRS motor 402, the locking mechanism 403, and the reduction gear mechanism 404. To the housing 401, the upper steering shaft 13 described above is fixed at the end on the downstream side. The housing 401 can rotate integrally with the upper steering shaft 13.

The VGRS motor 402 is a DC brushless motor having a rotor 402a as a rotator, a stator 402b as a stationary part, and a rotating shaft 402c as a shaft for outputting a driving force. The stator 402b is fixed to the inside of the housing 401, and the rotor 402a is rotatably held within the housing 401. The rotating shaft 402c is coaxially rotatably fixed to the rotor 402a. The rotating shaft 402c is configured to rotate integrally with the rotor 402a and is coupled with the reduction gear mechanism 404 at its end on the downstream side.

The reduction gear mechanism 404 is a planetary gear mechanism having a plurality of rotational elements which can perform differential rotation (a sun gear, a carrier, and a ring gear). Out of the plurality of rotational elements, the sun gear which is a first rotational element is coupled with the rotating shaft 402c of the VGRS motor 402, and the carrier which is a second rotational element is coupled with the housing 401. Moreover, the ring gear which is a third rotational element is coupled with a lower steering shaft 14 as a steering output shaft.

In the reduction gear mechanism 404 having such a configuration, a rotational speed of the upper steering shaft 13 according to the operation amount of the steering wheel 12 (i.e. a rotational speed of the housing 401 coupled with the carrier) and a rotational speed of the VGRS motor 402 (i.e. a rotational speed of the rotating shaft 402c coupled with the sun gear) uniquely determine a rotational speed of the lower steering shaft 14 coupled with the ring gear which is the remaining one rotational element. At this time, it is possible to control an increase and a reduction in the rotational speed of the lower steering shaft 14 by controlling an increase and a reduction in the rotational speed of the VGRS motor 402 by means of the differential action between the rotational elements. In other words, the upper steering shaft 13 and the lower steering shaft 14 can relatively rotate by the action of the VGRS motor 402 and the reduction gear mechanism 404. Moreover, in terms of the configuration of each rotational element in the reduction gear mechanism 404, the rotational speed of the VGRS motor 402 is transmitted to the lower steering shaft 14 in the state that it is reduced in accordance with a predetermined reduction ratio which is determined in accordance with a gear ratio between the rotational elements.

As described above, in the vehicle 10, since the upper steering shaft 13 and the lower steering shaft 14 can relatively rotate, a steering transmission ratio is continuously variably controlled in a range set in advance, wherein the steering transmission ratio is a ratio between a steering angle MA as a rotation angle of the upper steering shaft 13 and a front wheel rudder angle $\delta f$ which is uniquely determined according to the rotation amount of the lower steering shaft 14 (which is also related to a gear ratio of a rack and pinion mechanism described later). In other words, each of the front wheels is one example of the "steered wheel" of the present invention.

Incidentally, the reduction gear mechanism 404 may have not only the planetary gear mechanism exemplified here but also another aspect (e.g. an aspect in which the upper steering shaft 13 and the lower steering shaft 14 are relatively rotated by coupling gears, each of which has the different number of teeth, with the upper steering shaft 13 and the lower steering shaft 14, by providing a flexible gear which is in contact with each gear in one portion, and by rotating the flexible gear due to a motor torque transmitted via a wave generator, or similar aspects). Alternatively, the reduction gear mechanism 404 may have a physical, mechanical, or mechanistic aspect different from the aforementioned aspect even in the case of the planetary gear mechanism.

Incidentally, this is not illustrated, but the VGRS motor 402 is additionally provided with a rotation sensor such as a rotary encoder, capable of detecting a rotational phase difference $\delta vgrs$ between the rotating shaft 402c and the housing 401. This rotation sensor is electrically connected to the ECU 100, and the detected rotational phase difference $\delta vgrs$ is gauged by the ECU 100 with a regular or irregular period.

The locking mechanism 403 is provided with a lock holder 403a, a lock bar 403b, and a solenoid 403c, and it is one example of the "locking mechanism" of the present invention.

The lock holder 403a is a disc-shaped member which is fixed to the rotor 402a of the VGRS motor 402 and which can rotate integrally with the rotor 402a. In the outer circumferential portion of the lock holder 403a, a plurality of concave parts are formed in a circumferential direction.

The lock bar 403b is a lever-shaped engaging member which is fixed at its one end to a fixation site disposed in the housing 401 of the VGRS actuator 400 and which can turn with the fixation site as an axial fulcrum. On the other end of the lock bar 403b, convex parts which can engage with the concave parts formed in the outer circumferential portion of the lock holder 403a are formed. The lock bar 403b can turn in a range from a lock position at which the convex parts engage with the concave parts formed in the outer circumferential portion of the lock holder 403a to a lock release position at which they disengage from each other.

The solenoid 403c is an electromagnetic actuator capable of applying a driving force for turning the lock bar 403b. The solenoid 403c can turn the lock bar 403 between the lock position and the lock release position described above by the application of the driving force. The locking mechanism 403 can adopt, as its operation states, a lock state in which the convex parts of the lock bar 403b engage with the concave parts of the lock holder 403a and a lock release state in which they disengage from each other. Incidentally, the solenoid 403c is electrically connected to the ECU 100, and its drive state is controlled by the ECU 100.

If the locking mechanism 403 is in the lock state, the housing 401 and the rotor 402a are physically fixed. Thus, the rotational speeds of the two rotational elements of the reduction gear mechanism 404 coupled with the housing 401 and the rotor 402a are equal to each other. Thus, the rotational speed of the remaining one rotational element coupled with the lower steering shaft 14 is also uniquely determined. As a result, if the locking mechanism is in the lock state, the upper steering shaft 13 and the lower steering shaft 14 cannot relatively rotate, and the steering transmission ratio described above is uniquely fixed. On the other hand, if the locking mechanism 403 is in the lock release state, the rotation of the rotor 402a is not restricted by the housing 401. Thus, the upper steering shaft 13 and the lower steering shaft 14 can relatively rotate, and the steering transmission ratio is variable.

Incidentally, in the following explanation, the situation that the locking mechanism 403 is in the lock state and in the release state is expressed as "the VGRS actuator 400 is in the lock state and in the lock release state" or the like, as occasion demands.

Incidentally, the VRGS actuator 400 is driven by a not-illustrated VGRS driving apparatus which is electrically connected to the ECU 100. The VGRS driving apparatus is an electric drive circuit, including a PWM circuit, a transistor circuit, an inverter and the like, capable of electrifying the stator 402b of the VGRS motor 402. The VGRS driving apparatus is electrically connected to a battery 800 described later, and it can supply a drive voltage to the VGRS motor 402 by using electric power supplied from the battery. Moreover, the VGRS driving apparatus is electrically connected to the ECU 100, and its operations are controlled by the ECU 100.

Back in FIG. 1, in the vehicle 10, the rotation of the lower steering shaft 14 is transmitted to the rack and pinion mechanism. The rack and pinion mechanism is a steering transmission mechanism including: a not-illustrated pinion gear connected to the lower steering shaft 14 at the end on the downstream side; and a rack bar 15 in which gear teeth engaging with the gear teeth of the pinion gear are formed. The rotation of the pinion gear is converted into a motion in a horizontal direction in FIG. 1 of the rack bar 15, by which a steering force is transmitted to each steered wheel via a tie rod and a knuckle (whose reference numerals are omitted) coupled with both ends of the rack bar 15.

The EPS actuator 500 is provided with an EPS motor as a DC brushless motor including: a not-illustrated rotor as a rotator to which a permanent magnet is attached; and a stator as a stationary part which surrounds the rotor, and it is an electric power steering apparatus as one example of the "steering torque assisting device" of the present invention.

The EPS motor can generate an assist torque TA in a direction of rotation of the rotor, which is rotated by the action of a rotating magnetic field formed in the EPS motor due to the electrification to the stator via a not-illustrated electric driving apparatus.

On the other hand, a not-illustrated reduction gear is fixed to a motor shaft as a rotating shaft of the EPS motor, and this reduction gear also directly or indirectly engages with a reduction gear disposed on the lower steering shaft 14. Thus, in the embodiment, the assist torque TA generated from the EPS motor functions as a torque for assisting the rotation of the lower steering shaft 14. Thus, if the assist torque TA is applied in the same direction of a driver steering torque MT applied to the upper steering shaft 13 via the steering wheel 12, a driver's steering load is reduced by the amount of the assist torque TA.

Incidentally, the VGRS actuator 400 and the EPS actuator 500 may be configured as a mutually unified actuator.

The vehicle 10 is provided with a steering angle sensor 16 and a steering torque sensor 17.

The steering angle sensor 16 is an angle sensor capable of detecting the steering angle MA which indicates the rotation amount of the upper steering shaft 13. The steering angle sensor 16 is electrically connected to the ECU 100, and the detected steering angle MA is referred to by the ECU 100 with a regular or irregular period.

The steering torque sensor 17 is a sensor capable of detecting the driver steering torque MT applied via the steering wheel 12 from the driver. Explaining it more specifically, the upper steering shaft 13 has such a configuration that it is divided into an upstream part and a downstream part and that the parts are mutually coupled by using a not-illustrated torsion bar. To the both ends on the upstream side and the downstream side of the torsion bar, rings for detecting a rotational phase difference are fixed. The torsion bar is twisted in its rotational direction in accordance with the steering torque (i.e. the driver steering torque MT) transmitted through the upstream part of the upper steering shaft 13 when the driver of the vehicle 10 operates the steering wheel 12, and the torsion bar can transmit the steering torque to the downstream part while generating the twist. Therefore, upon the transmission of the steering torque, there is the rotational phase difference between the rings for detecting the rotational phase difference described above. The steering torque sensor 17 can detect the rotational phase difference, convert the rotational phase difference to the steering torque, and output it as an electrical signal corresponding to the driver steering torque MT. The steering torque sensor 17 is electrically connected to the ECU 100, and the detected driver steering torque MT is referred to by the ECU 100 with a regular or irregular period.

Incidentally, a method of detecting the steering torque is not limited to this type of torsion bar method, but may adopt another method. For example, such a configuration that a torque sensor is incorporated in the EPS actuator 500 is also general. In specifying the driver steering torque MT, a method of using a detected value of the torque sensor or a method of estimating it on the basis of the detected value of the torque sensor or a similar method may be adopted. In this case, the steering torque sensor 17 which is configured as a separate body from the EPS actuator 500 is not necessarily installed.

The ECB 600 is an electronically-controlled braking apparatus as one example of the "braking system" of the present invention, capable of applying a braking force individually to each of the left and right front and rear wheels of the vehicle 10. The ECB 600 is provided with: a brake actuator 610; and braking apparatuses 620FL, 620FR, 620RL, and 620RR corresponding to the left front wheel FL, the right front wheel FR, the left rear wheel RL and the right rear wheel RR, respectively.

The brake actuator 610 is a hydraulic control actuator configured to supply hydraulic oil individually to each of the braking apparatuses 620FL, 620FR, 620RL, and 620RR. The brake actuator 610 is provided with a master cylinder, an electric oil pump, a plurality of hydraulic transmission paths, an electromagnetic valve disposed in each of the hydraulic transmission paths, and the like, and it can control the opening/closing state of the electromagnetic valve, thereby controlling the hydraulic pressure of the hydraulic oil supplied to a wheel cylinder provided for each braking apparatus, individually in each braking apparatus. The hydraulic pressure of the hydraulic oil has a one-on-one relation with the pressing force of a braking pad provided for each braking apparatus, and the high and low hydraulic pressures of the hydraulic oil correspond to the large and small braking forces of each braking apparatus, respectively.

The brake actuator 610 is electrically connected to the ECU 100, and the braking force applied to each wheel from each braking apparatus is controlled by the ECU 100.

The vehicle 10 is provided with an in-vehicle camera 18 and a vehicle speed sensor 19.

The in-vehicle camera 18 is an imaging apparatus which is disposed on a front nose of the vehicle 10 or the like and which can image a predetermined area ahead of the vehicle 10. The in-vehicle camera 18 is electrically connected to the ECU 100, and the imaged area ahead is sent out to the ECU 100 as image data with a regular or irregular period. The ECU 100 can analyze the image data and obtain various data necessary for various vehicle behavior controls such as, for example, lane keeping control and a trajectory following control.

The vehicle speed sensor 19 is a sensor capable of detecting a vehicle speed V as the speed or velocity of the vehicle 10. The vehicle speed sensor 19 is electrically connected to the ECU 100, and the detected vehicle speed V is referred to by the ECU 100 with a regular or irregular period.

The ARS actuator 700 is a rear wheel steering actuator as one example of the "rear wheel rudder angle varying device" of the present invention, capable of changing a rear wheel rudder angle δr, which is a rudder angle of the left rear wheel RL and the right rear wheel RR, independently of the steering input given by the driver via the steering wheel 12. In other words, each of the rear wheels is also one example of the "steered wheel" of the present invention.

The ARS actuator 700 contains an ARS motor and a reduction gear mechanism, and a drive circuit of the ARS motor is electrically connected to the ECU 100. Therefore, the ECU 100 can control an ARS torque $T_{ars}$, which is an output torque of the ARS motor, by controlling the drive circuit.

On the other hand, the reduction gear can transmit the torque of the ARS motor to a rear steering rod 20 with deceleration.

The rear steering rod 20 is coupled with the left rear wheels RL and the right rear wheel RR via joint members 21RL and 21RR, respectively. If the rear steering rod 20 is driven by the ARS torque $T_{ars}$ in a horizontal one direction illustrated, each of the rear wheels is steered in one direction.

Incidentally, the ARS actuator 700 may be provided with a direct acting mechanism capable of converting a rotary motion into a stroke motion. If this type of direct acting mechanism is provided, the rear steering rod 20 may change the rudder angle of the rear wheels in accordance with the stroke motion in the horizontal direction of this direct acting mechanism.

Incidentally, the practical aspect of the rear wheel rudder angle varying device is not limited to that of the ARS actuator 700 illustrated, as long as it can make the rear wheel rudder angle δr variable in a predetermined range.

The ARS actuator 700 is provided with an ARS locking mechanism (not illustrated) as another example of the "locking mechanism" of the present invention capable of fixing a rotor of the ARS motor in an unrotatable manner. The ARS locking mechanism is controlled by the ECU 100 electrically connected thereto. If the ARS locking mechanism fixes the rotation of the rotor of the ARS motor, the rear wheel rudder angle δr is fixed to the value at that time point. Incidentally, the ARS actuator 700 is not physically coupled with the steering wheel 12; however, the ECU 100 controls the ARS actuator 700 so as to obtain the rear wheel rudder angle δr determined in advance in accordance with the steering angle MA and the vehicle speed V or the like, and it is no different from that a relation between the steering angle MA and the rear wheel rudder angle δr is uniquely fixed by the action of the ARS locking mechanism.

Incidentally, the vehicle 10 in the embodiment is provided with: not only the VGRS actuator 400 and the ARS actuator 700 for controlling the rudder angles of the front and rear wheels independently of the steering input from the driver's side; but also the ECB 600 and the driving force distributing apparatus 300 capable of changing the left-right braking/driving force differences of the front and rear wheels; and the EPS actuator 500 capable of applying the assist torque TA. Such a vehicle configuration indicates that state controlled variables (δf, δr, Ff, Fr, and TA, etc.) for controlling various vehicle state quantities, such as, for example, a yaw rate γ, a slip angle β, or a steering reaction torque T, independently of one another can be controlled, and it is merely one configuration example that the vehicle of the present invention can adopt. For example, the vehicle of the present invention may need a minimum of two apparatuses, which are the VGRS actuator 400 or the ARS actuator 700 and the EPS actuator 500, in the case of the vehicle 10.

Figure 3:
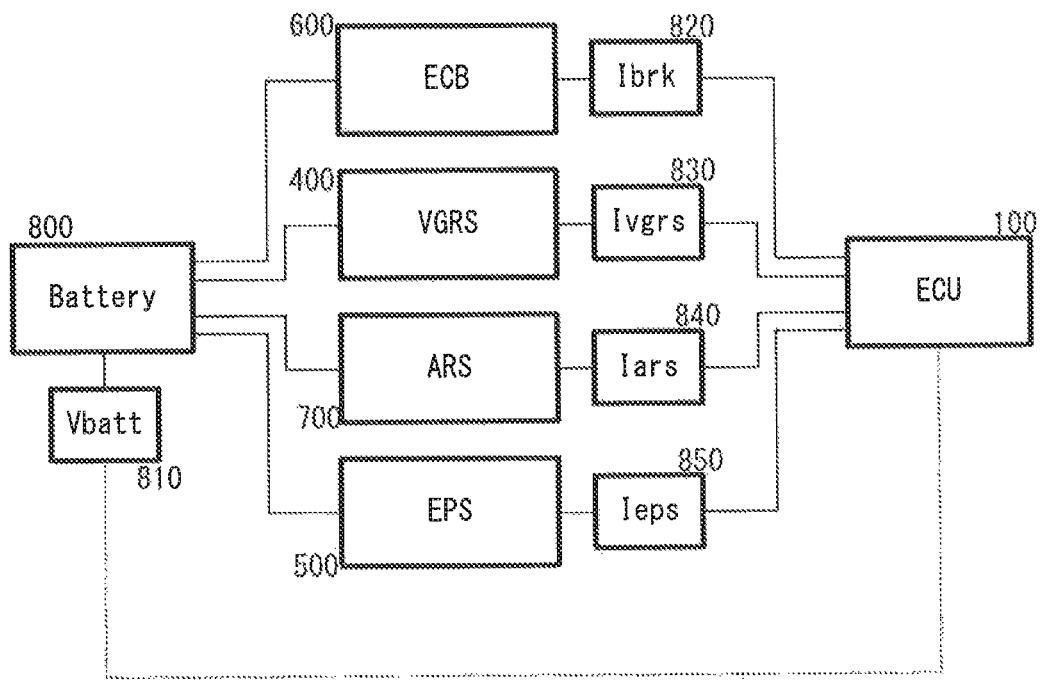
FIG. 3 is a block diagram showing a power supply system in the vehicle in FIG. 1.

Next, with reference to FIG. 3, a power supply system in the vehicle 10 will be explained. FIG. 3 is a block diagram showing the power supply system in the vehicle 10. Incidentally, in FIG. 3, portions overlapping those of FIG. 1 will carry the same reference numerals, and the explanation thereof will be omitted as occasion demands.

In FIG. 3, the vehicle 10 is provided with the battery 800. The battery 800 is a known in-vehicle direct current 12V battery functioning as one example of the "power supply source" of the present invention. The battery 800 is provided with a voltage sensor 810 capable of detecting a battery voltage value Vbatt (i.e. one example of the "supply voltage" of the present invention). The voltage sensor 810 is electrically connected to the ECU 100, and the detected battery voltage value Vbatt is referred to by the ECU 100 with a regular or irregular period.

In the vehicle 10, the battery 800 is a power supply source shared by an entire chassis system including: a steering system composed of the VGRS actuator 400, the ARS actuator 700, and the EPS actuator 500; and the ECB 600 (braking system).

Incidentally, the vehicle 10 is provided with a current sensor 820 capable of detecting an ECB consumption current value Ibrk which is a consumption current value of the ECB 600. The current sensor 820 is electrically connected to the ECU 100, and the detected ECB consumption current value Ibrk is referred to by the ECU 100 with a regular or irregular period.

Moreover, the vehicle 10 is provided with a current sensor 830 capable of detecting a VGRS consumption current value Ivgrs which is a consumption current value of the VGRS actuator 400. The current sensor 830 is electrically connected to the ECU 100, and the detected VGRS consumption current value Ivgrs is referred to by the ECU 100 with a regular or irregular period.

Moreover, the vehicle 10 is provided with a current sensor 840 capable of detecting an ARS consumption current value Iars which is a consumption current value of the ARS actuator 700. The current sensor 840 is electrically connected to the ECU 100, and the detected ARS consumption current value Iars is referred to by the ECU 100 with a regular or irregular period.

Moreover, the vehicle 10 is provided with a current sensor 850 capable of detecting an EPS consumption current value Ieps which is a consumption current value of the EPS actuator 500. The current sensor 850 is electrically connected to the ECU 100, and the detected EPS consumption current value Ieps is referred to by the ECU 100 with a regular or irregular period.

Incidentally, in a power supply system between the battery 800 and the chassis system, there is interpolated a boosting apparatus for boosting the direct current 12V voltage supplied from the battery 800 in its normal and non-load case; however, the illustration and explanation thereof will be omitted in order to prevent a complicated explanation.

Moreover, the vehicle 10 is additionally provided with an outside air temperature sensor which is not illustrated and which can detect an outside air temperature temp of the vehicle 10. The outside air temperature sensor is electrically connected to the ECU 100, and the detected outside air temperature temp is referred to by the ECU 100 with a regular or irregular period.

Incidentally, the vehicle 10 is provided with a not-illustrated alternator. The alternator is provided with a rotor, which rotates substantially integrally with the crankshaft of the engine 200, and can generate three-phase alternating current electric power by the rotor rotating in a stator in an electrified state. The three-phase alternating current electric power is converted into direct current power by a rectifying device and is supplied to electrical auxiliaries including the aforementioned various devices (the ECB 600, the VGRS 400, the ARS 700, and the EPS 500) and the battery 800. The generated output of the alternator can vary depending on the engine rotational speed NE of the engine 200 except for an operating area in which an upper limit is cut by a built-in regulator. As the engine rotational speed NE becomes higher, larger generated output can be obtained.

Moreover, the battery 800 is additionally provided with a sensor capable of detecting an input current Iin inputted to the battery 800 upon charging by the alternator and a sensor capable of detecting an output current Iout outputted from the battery 800 with the supply of the electric power to the electrical auxiliaries. Each of the sensors is electrically connected to the ECU 100. The ECU 100 estimates a discharge and charge balance of the battery 800 on the basis of the input current Iin and the output current Iout. Moreover, the ECU 100 estimates the amount of power generated (a generated output value) by the alternator on the basis of the input current Iin or on the basis of the engine rotational speed NE of the engine 200.

Operations of Embodiment

Next, operations of the embodiment will be explained.

Figure 4:
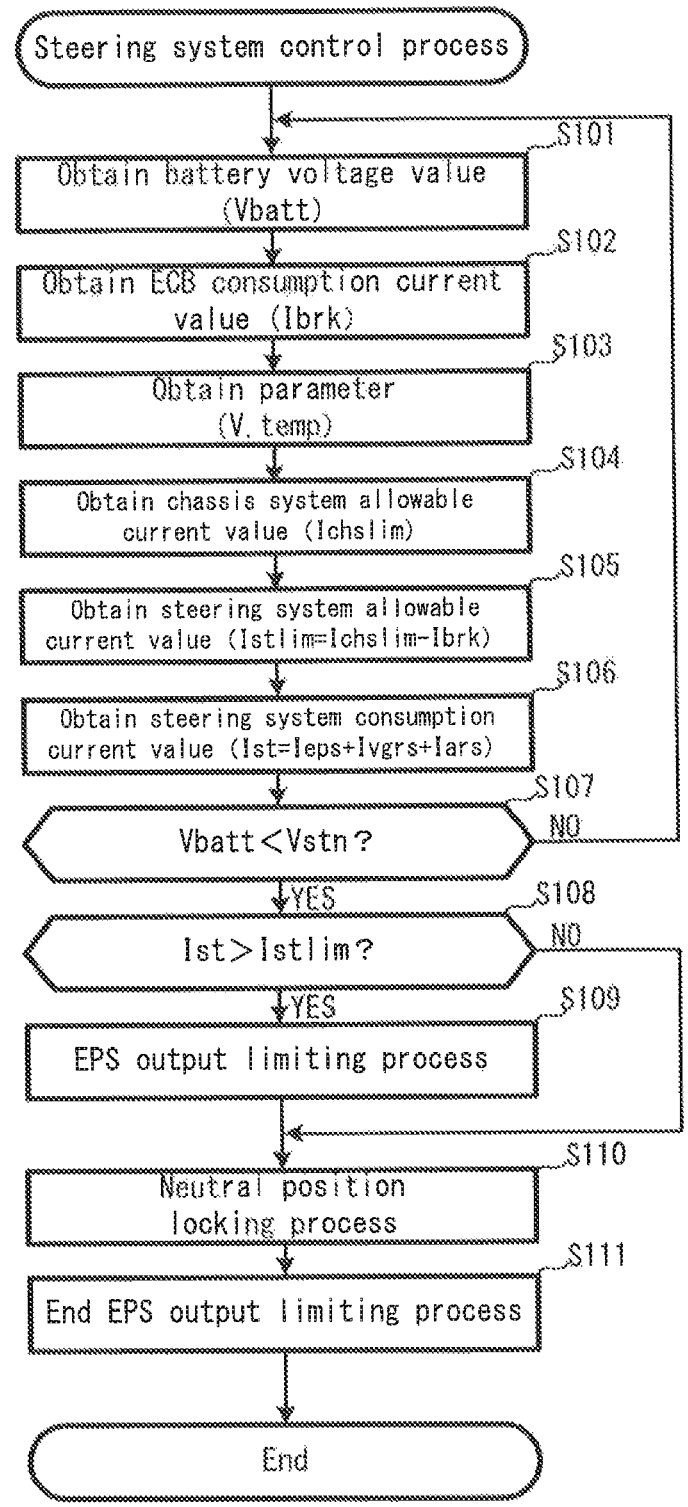
FIG. 4 is a flowchart showing a steering system control process performed in the vehicle in FIG. 1.

Firstly, with reference to FIG. 4, the details of the steering system control process performed by the ECU 100 will be explained. FIG. 4 is a flowchart showing the steering system control process. The steering system control process is a process of suppressing the deterioration of the steering feeling for the vehicle 10 in a case where a power supply capacity of the battery 800 is reduced for some reasons.

In FIG. 4, firstly, the battery voltage value Vbatt is obtained (step S101). Then, the ECB consumption current value Ibrk is obtained (step S102). Then, the vehicle speed V and the outside air temperature temp are obtained as parameters (step S103).

Then, a chassis system allowable current value Ichslim is obtained (step S104). The chassis system allowable current value Ichslim is an upper limit of an electric current that can be used in the entire chassis system set in advance experimentally, experientially, or theoretically and is stored in the ROM as a fixed value according to the vehicle speed V and the outside air temperature temp described above.

In one example, the chassis system allowable current value Ichslim is set to be higher step by step with an increase in the vehicle speed V. This is because the power consumption of the ECB 600 tends to increase with increasing vehicle speed, and it indicates that the amount of the increase is predicted and that the chassis system allowable current value Ichslim is increased. On the other hand, the chassis system allowable current value Ichslim is set to be lower step by step with an increase in the outside air temperature temp. This is because the power consumption of an air conditioner or the like tends to increase with an increase in the outside air temperature temp, and it indicates that the amount of air conditioner consumption is predicted and that the chassis system allowable current value Ichslim is ensured. However, aside from the power consumption tendency of other electrical auxiliaries as described above, if the outside air temperature is excessively low or high, charge and discharge efficiency of the battery 800 or a charge and discharge amount per unit time may decrease. In view of the circumstances, the chassis system allowable current value Ichslim may be set to be smaller in a cool or low temperature area or a high temperature area other than a common temperature area between upper and lower limits of this type, in comparison with in the common temperature area.

Incidentally, the battery 800 is charged by the alternator as described above, in an operating area of the engine 200. The amount of power generated by the alternator is estimated by the ECU 100 as described above. In a situation in which the amount of power generated by the alternator is sufficiently ensured, it is reasonable to consider that there is no problem in practice even if the chassis system allowable current value Ichslim is set to be larger. In the embodiment, for each of ranges of the amount of power generated by the alternator divided in accordance with a reference or standard established in advance experimentally, experientially, or theoretically, there is prepared a correction factor (correction factor>1) by which the stored chassis system allowable current value Ichslim is to be multiplied. The ECU 100 corrects the chassis system allowable current value Ichslim as occasion demands by arithmetic processing based on the correction factor.

Incidentally, the correction factor is, for example, 1 if the amount of power generated by the alternator belongs to the smallest section, and it increases with increasing amount of generated power. Incidentally, of course, the chassis system allowable current value Ichslim which takes into account the amount of power generated by the alternator may be stored in the ROM in accordance. Moreover, since the amount of power generated by the alternator varies depending on the engine rotational speed NE, referring to the engine rotational speed NE instead of the amount of power generated by the alternator is no problem in practice.

Then, a steering system allowable current value Istlim is obtained (step S105). The steering system allowable current value Istlim is set in accordance with the following equation (1).

$$Istlim = Ichslim - Ibrk \quad (1)$$

Namely, the equation (1) means that out of the electric current which can be used by the entire chassis system, an electric current necessary for the operations of the ECB 600 is ensured in order to ensure vehicle safety. Incidentally, from the relation in the equation (1), in association with variability in the chassis system allowable current value Ichslim based on the outside air temperature temp, the vehicle speed V, and the engine rotational speed NE or the amount of power generated by the alternator, the steering system allowable current value Istlim is also variable with respect to them.

If the steering system allowable current value Istlim is obtained, a steering system consumption current value Ist is calculated in accordance with the following equation (2) (step S106).

$$Ist = Ieps + Ivgrs + Iars \quad (2)$$

In other words, the steering system consumption current value Ist is an additional value of the consumption current in the steering system, i.e. the system composed of the EPS actuator 500, the VGRS actuator 400, and the ARS actuator 700.

If the obtainment of the values is ended, the ECU 100 judges whether or not the battery voltage value Vbatt is less than a steering system operation guaranteed voltage value Vstn (step S107). Incidentally, as described above, in the embodiment, the battery voltage value Vbatt is used as a judgment index for specifying the power supply capacity of the battery 800. Therefore, the steering system operation guaranteed voltage value Vstn is one example of the "reference" of the present invention. If the battery voltage value Vbatt is greater than or equal to the steering system operation guaranteed voltage value Vstn (the step S107: NO), i.e. even if the battery voltage value Vbatt is lower than a non-load voltage corresponding value (a non-load voltage value or a voltage value after boosting the non-load voltage) in the normal case, if a practically problem-free value for operating the steering system is ensured, the process is returned to the step S101, and a series of process operations is repeated.

Incidentally, the steering system operation guaranteed voltage value Vstn is higher than a value obtained by adding the amount of a voltage drop, caused by an internal resistance of the battery 800 if the entire steering system is driven at a maximum current value, to a VGRS protection setting voltage value Vvgrslim which is set to immediately stop the operations of the VGRS actuator 400 and which is higher than an EPS protection setting voltage value Vepslim which is set to immediately stop the operations of the EPS actuator 500.

On the other hand, if the battery Vbatt is less than the steering system operation guaranteed voltage value Vstn (the step S107: YES), the ECU 100 judges whether or not the steering system consumption current value Ist is greater than the steering system allowable current value Istlim (step S108). If the steering system consumption current value Ist is less than or equal to the steering system allowable current value Istlim (the step S108: NO), it is not necessary to limit the operations of the steering system, and thus, the process is moved to a step S110, and a neutral position locking process is performed. Incidentally, the neutral position locking process will be described later.

On the other hand, if the steering system consumption current value Ist is greater than the steering system allowable current value Istlim (the step S108: YES), the ECU 100 performs an EPS output limiting process (step S109). The EPS output limiting process is a process of reducing the electric current consumption of the EPS actuator 500 such that the steering system consumption current value Ist is the steering system allowable current value Istlim (or a value which is smaller than the steering system allowable current value Istlim by a predetermined value or a predetermined ratio). In other words, in the step S109, an excess electric power enabling the ARS actuator 700 and the VGRS actuator 400 as the rudder angle varying device to certainly operate is obtained, and then, the assistance of the driver steering torque MT by the EPS actuator 500 is continued as long as possible. If the EPS output limiting process is performed, the process is moved to the step S110.

Figure 5:
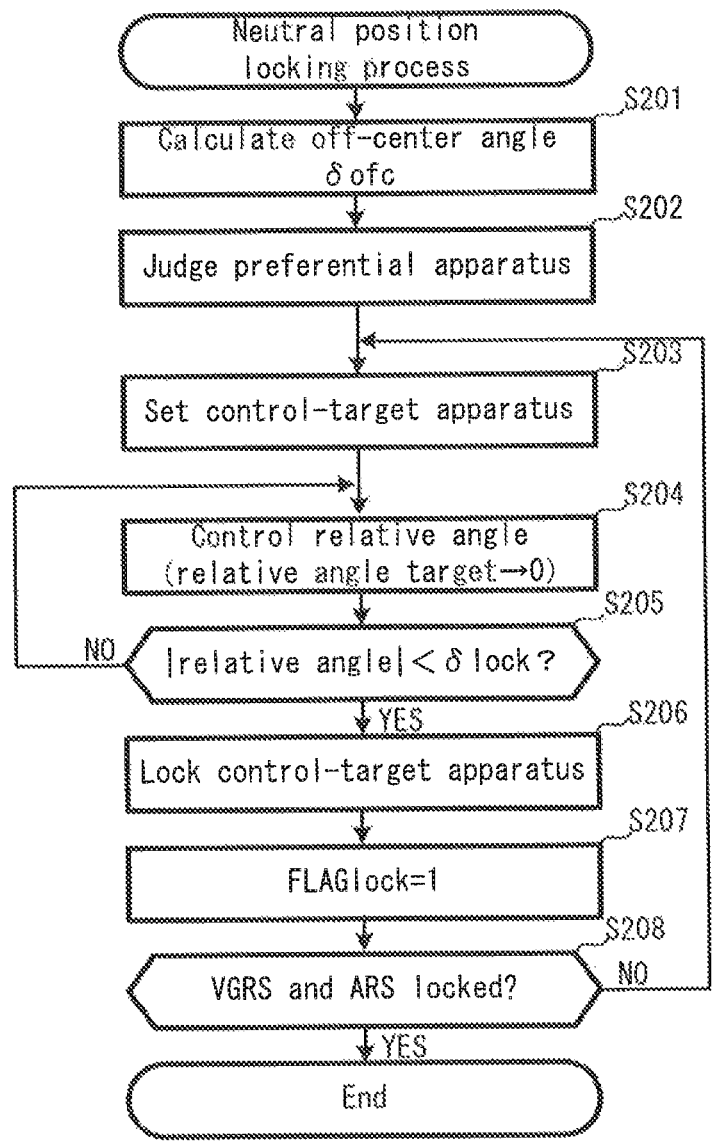
FIG. 5 is a flowchart showing a neutral position locking process in the steering system control process in FIG. 4.

Now, with reference to FIG. 5, the details of the neutral position locking process in the step S110 will be explained. FIG. 5 is a flowchart showing the neutral position locking process.

In FIG. 5, the ECU 100 calculates an off-center angle δofs for each of the front wheels and the rear wheels (step S201). The off-center angle is a deviation amount from a neutral position of the steered wheels with respect to a neutral position of the steering wheel, in each of the VGRS actuator 400 and the ARS actuator 700.

If the off-center angle δofs is calculated, an apparatus to be prioritized out of the VGRS actuator 400 and the ARS actuator 700 is judged (step S202). Specifically, an apparatus having a larger off-center angle δofs calculated in the step S201 is set as a preferential target. This is because the larger off-center angle δofs contributes more to the steering feeling deterioration. In particular, if the battery voltage value Vbatt is reduced drastically or similar things happen for some reasons and drops below the VGRS protection setting voltage value or the ARS protection setting voltage value (which are assumed to be equal in the embodiment), and if they are immediately stopped, then, the apparatus having the larger off-center angle δofs can further deteriorate the steering feeling. Thus, the apparatus having the larger off-center angle δofs firstly conducts a measure associated with the neutral position matching.

If the apparatus to be prioritized is judged, firstly, the apparatus to be prioritized is set as a control-target apparatus (step S203). If the control-target apparatus is set, control for a relative angle of the rudder angle is started, with a relative angle target value as zero (step S204).

Incidentally, the relative angle of the rudder angle is a rotation angle of the lower steering shaft 14 with respect to the rotation angle of the upper steering shaft 13 which rotates in conjunction with the steering wheel 12, i.e. a VGRS relative angle δvgrs (i.e. the actual rudder angle of the front wheels is not necessarily zero) in the case of the front wheels (VGRS) which are mechanically coupled with the steering wheel 12. The relative angle of the rudder angle is the rear wheel rudder angle δr in the case of the rear wheels (ARS) which are not mechanically coupled with the steering wheel 12.

If the relative angle control is started, it is judged whether or not an absolute value of the relative angle is reduced to less than a neutral judgment reference value Mock (step S205). If the absolute value of the relative angle is greater than or equal to the neutral judgment reference value (the step S205: NO), the process is returned to the step S204.

Incidentally, the neutral judgment reference value Mock may be zero as one form (in this case, not "less than" but "less than or equal to" is appropriate); however, it may be a value greater than zero as long as the rudder angle of the steered wheels (front wheels or rear wheels) returns to almost the rudder angle neutral point if the steering wheel 12 is returned to the neutral position and the vehicle 10 can maintain a substantially straight-ahead driving state in a practically problem-free range (i.e. the deterioration of the steering feeling is not actualized). Such a value can be determined in advance, for example, experimentally, experientially, or theoretically.

If the absolute value of the relative angle is reduced to less than the neutral judgment reference value (the step S205: YES), the control-target apparatus is locked by the locking mechanism (the locking mechanism 403 or the ARS locking mechanism) additionally provided for each apparatus (step S206). If the locking of the control-target apparatus is completed, a locking completion flag FLAGlock associated with the control-target apparatus is set to "1" indicating the locking completion (step S207), and the process is moved to a step S208. If the locking is completed, the rudder angle change of the steered wheels with respect to the steering angle MA becomes unique or unambiguous (in the case of the rear wheels, there is no rudder angle change because the rear wheels are not coupled with the steering wheel 12) and an unintended change does not occur.

Incidentally, here, the condition that the absolute value of the relative angle is reduced to less than the neutral judgment reference value is set as a condition for judging whether or not a locking preparation is completed. When an elapsed time after the absolute value of the relative angle is reduced to less than the neutral judgment reference value reaches a predetermined time, it may be judged the locking preparation is completed.

In the step S208, it is judged whether or not both the VGRS actuator 400 and the ARS actuator 700 are locked. If the locking of one of the apparatuses is not completed (the step S208: NO), the process is returned to the step S203, and the relative angle control for the other apparatus is started by a series of process operations. If the locking of both of the apparatuses is completed (the step S208: YES), the neutral position locking process is ended.

Back in FIG. 4, if the neutral position locking process is ended, the EPS output limiting process started in the step S109 is ended (step S111), the normal assistance of the steering torque by the EPS actuator 500, which is temporarily limited due to the neutral position locking of the rudder angle varying apparatus, achieves a recovery. The steering system control process is performed in the above manner.

Figure 6:
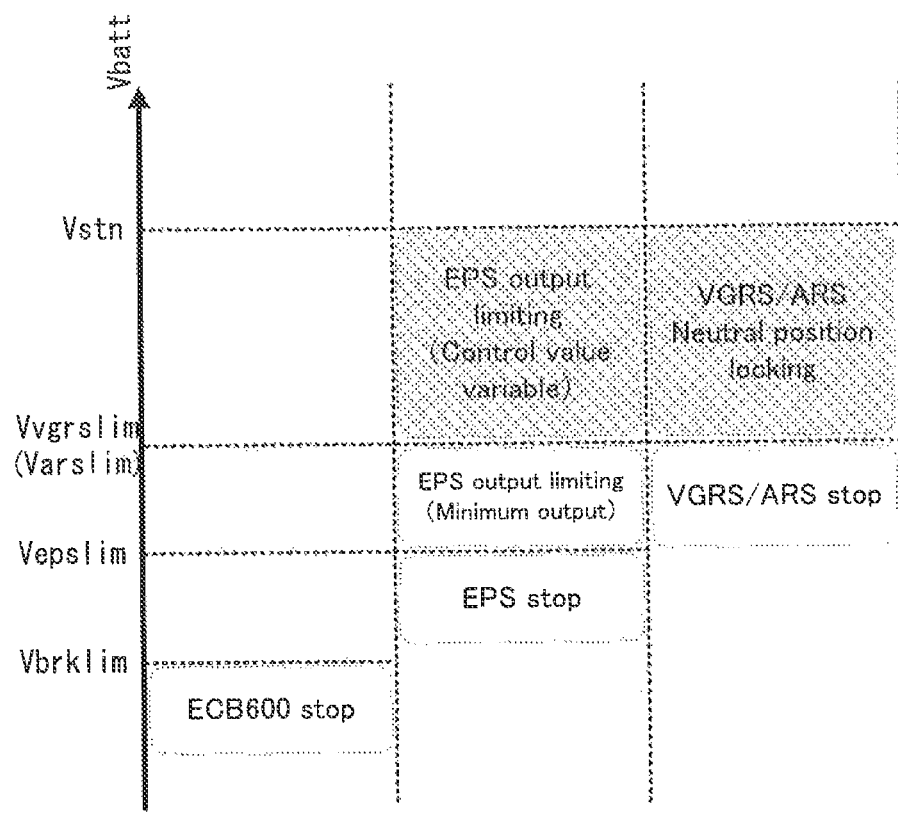
FIG. 6 is a view visually showing the characteristics of the steering system control process in FIG. 4.

Now, the characteristics of the steering system control process will be explained with reference to FIG. 6. FIG. 6 is a view visually showing the characteristics of the steering system control process.

In FIG. 6, a horizontal axis indicates the battery voltage value Vbatt. If the battery voltage value Vbatt is reduced to less than the steering system operation guaranteed voltage value Vstn, the EPS output limiting process and the neutral position locking process by the VGRS actuator 500 and the ARS actuator 700 are performed, as in an illustrated hatching display portion, in a voltage area in which the battery voltage value Vbatt is greater than or equal to the VGRS protection setting voltage value Vvgrslim (or the ARS protection setting voltage value Varslim).

In other words, according to the steering system control process in the embodiment, it is possible to complete the neutral position locking of the rudder angle varying device, quickly and certainly, by temporarily limiting the electric current consumption of the EPS actuator 500 whose operations are originally to be prioritized and by giving and taking the electric current in the range of the electric current allowed in the steering system, in accordance with a relative relation (or correlation) between the steering system consumption current value Ist and the steering system allowable current value Istlim, in a voltage area in which it is not necessary to immediately stop the rudder angle varying device even if the battery voltage Vbatt is reduced. Therefore, it is possible to prevent the deviation of the vehicle due to the rudder angle change left in the front wheels or the rear wheels if the steering wheel 12 is returned to the neutral position and the deviation of the vehicle due to the unintended rudder angle change in the course of continuing the operations of the steering wheel 12, or the like, and it is also possible to preferably suppress the deterioration of the steering feeling caused by the deviation of the vehicle.

Incidentally, if the battery voltage Vbatt is reduced to the VGRS protection setting voltage value Vvgrslim (the ARS protection setting voltage value Varslim) or less, the VGRS actuator 400 and the ARS actuator 700 are immediately stopped, and the EPS actuator 500 maintains the assistance at the lowest output. Moreover, if the battery voltage Vbatt is reduced to the EPS protection setting voltage value Vepslim or less, the assistance of the steering torque by the EPS actuator 500 is immediately stopped. Moreover, if the battery voltage Vbatt is reduced to an ECB protection setting voltage Vbrklim or less, the ECB 600 is immediately stopped. As described above, according to the embodiment, in an apparatus contributing more to driving safety of the vehicle 10, the protection setting voltage is set to be lower, and the control is maintained as long as possible. Thus, the safety of the vehicle 10 is preferably ensured.

Incidentally, as described above, in the embodiment, the battery voltage Vbatt is used as the judgment index for specifying the power supply capacity of the battery 800. However, the judgment index for specifying the power supply capacity of the battery 800 is not necessarily limited to the battery voltage Vbatt. For example, the battery 800 is charged by the alternator, as described above, in the operating area of the engine 200.

Here, if the discharge and charge balance of the battery 800 is inclined to the positive side (i.e. charge amount>discharge amount), it can be considered that the battery 800 has an excess electric power. On the other hand, if the discharge and charge balance of the battery 800 is inclined to the negative side (i.e. charge amount<discharge amount), it can be considered that the power supply capacity of the battery 800 is reduced.

In other words, in specifying the power supply capacity of the battery 800, the discharge and charge balance of the battery 800 can be an effective reference element. From a standpoint of practical operation, for example, if a reference value (i.e. another example of the "reference" of the present invention) is set for the discharge and charge balance of the battery 800 and if the discharge and charge balance of the battery 800 is inclined to the negative side from the reference value, it can be judged that the power supply capacity of the battery 800 is reduced. The reference value may be, for example, a zero point, a negative value in the vicinity of the zero point (in this case, an operation allowed area of the steering system extends) or a positive value in the vicinity of the zero point (in this case, it is safer from the viewpoint of system protection).

The present invention is not limited to the aforementioned embodiment, but various changes may be made, if desired, without departing from the essence or spirit of the invention which can be read from the claims and the entire specification. A vehicle steering control apparatus, which involves such changes, is also intended to be within the technical scope of the present invention.

INDUSTRIAL APPLICABILITY

The present invention can be used for, for example, a vehicle having a function of making the vehicle follow a target driving route.

DESCRIPTION OF REFERENCE CODES

FL, FR, RL, RR wheel
10 vehicle
11 propeller shaft
12 steering wheel
13 upper steering shaft
14 lower steering shaft
15 rack bar
16 steering angle sensor
17 steering torque sensor
100 ECU
200 engine
300 driving force distributing apparatus
310 center differential mechanism
320 front differential mechanism
330 rear differential mechanism
400 VGRS actuator
500 EPS actuator 600 ECB
610 brake actuator
620FL, 620FR, 620RL, 620RR braking apparatus
700 ARS actuator
800 battery

The invention claimed is:

1. A vehicle steering control apparatus in a vehicle, the vehicle comprising:
a steering system including at least a rudder angle varying device capable of changing a relation between a steering angle, which is a rotation angle of a steering wheel, and a rudder angle of steered wheels and a steering torque assisting device capable of assisting a driver steering torque; and a power supply source for supplying electric power to the steering system, wherein the rudder angle varying device includes:
a front wheel rudder angle varying device in which front wheels are regarded as the steered wheels;
a rear wheel rudder angle varying device in which rear wheels are regarded as the steered wheels; and
a locking mechanism for uniquely fixing the relation,
said vehicle steering control apparatus comprising:
a supply capacity specifying device for specifying a supply capacity of supplying the electric power in the power supply source;
a consumption current specifying device for specifying a consumption current value of the steering system;
a limiting device for limiting electric current consumption of the steering torque assisting device if the specified consumption current value is greater than a maximum allowable current value of the steering system in a case where the specified supply capacity is reduced with respect to a reference; and
a controlling device, in a situation in which the electric current consumption of the steering torque assisting device is limited, for:
calculating a deviation amount from the neutral position of the steered wheels in the steered wheels with respect to the neutral position of the steering wheel,
preferentially controlling one of the front wheel rudder angle varying device and the rear wheel rudder angle varying device, the calculated deviation amount of which is larger than that of the other of the front wheel rudder angle varying device and the rear wheel rudder angle varying device, such that a neutral position of the steering wheel matches a neutral position of steered wheels corresponding to the one of the front wheel rudder angle varying device and the rear wheel rudder angle varying device,
controlling the other of the front wheel rudder angle varying device and the rear wheel rudder angle varying device such that the neutral position of the steering wheel matches a neutral position of steered wheels corresponding to the other of the front wheel rudder angle varying device and the rear wheel rudder angle varying device, and
controlling the locking mechanism such that the relation is uniquely fixed after the neutral position of the steering wheel matches the neutral position of the steered wheels;
wherein said limiting device withdraws limiting electric current consumption of the steering torque assisting device after controlling the locking mechanism such that the relation is uniquely fixed.

2. The vehicle steering control apparatus according to claim 1, wherein said supply capacity specifying device specifies the supply capacity on the basis of a supply voltage value of the power supply source.

3. The vehicle steering control apparatus according to claim 1, wherein said supply capacity specifying device specifies the supply capacity on the basis of a discharge and charge balance of the power supply source.

4. The vehicle steering control apparatus according to claim 1, wherein said limiting device limits the electric current consumption in accordance with the maximum allowable current value.

5. The vehicle steering control apparatus according to claim 1, wherein
the vehicle comprises an internal combustion engine and an alternator, and
the maximum allowable current value varies depending on a vehicle speed, an outside air temperature, an engine rotational speed of the internal combustion engine, or amount of power generated by the alternator.

6. The vehicle steering control apparatus according to claim 1, wherein
the vehicle comprises a braking system which shares the power supply source with the steering system, and
the maximum allowable current value is a value obtained by subtracting a current value used by the braking system, from a current value which can be used by an entire chassis system including at least the steering system and the braking system.

* * * * *